May 29, 1923.  
F. O. BOSWELL  
VEHICLE WHEEL  
Filed Oct. 11, 1920

INVENTOR  
Fletcher O. Boswell  
By W. W. Williamson  
Atty.

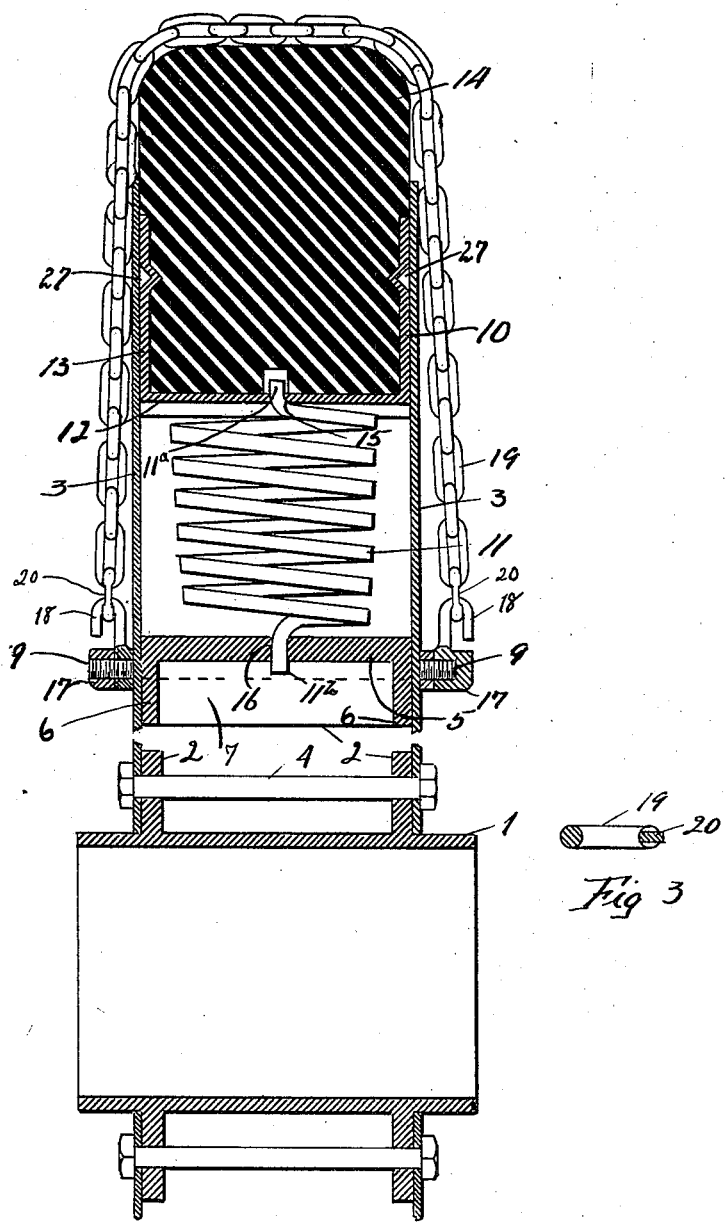

Patented May 29, 1923.

1,457,142

UNITED STATES PATENT OFFICE.

FLETCHER O. BOSWELL, OF PHILADELPHIA, PENNSYLVANIA.

VEHICLE WHEEL.

Application filed October 11, 1920. Serial No. 416,106.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Wheels, of which the following is a specification.

My invention relates to a new and useful improvement in vehicle wheels, and has for its object to so construct a wheel as to give a resiliency thereto so that in carrying a load it will absorb the shock and vibration incident to traveling over a rough road bed and prevent said shock and vibration from being transmitted to the vehicle.

A further object of my invention is to construct the resilient element of the wheel of a series of sections or units each being independently resilient, thus preventing the transmission of shock and vibration by that portion of the wheel in contact with the road bed to the remainder thereof.

A still further object of my invention is to provide for the ready removal of the resilient units and the tire carried thereby for repair or renewal.

A still further object of my invention is to provide for the attachment of anti-skid chains to the wheel.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 2, is an enlarged section at the line 2—2 of Fig. 1.

Fig. 3, is a section of one of the non-skid chain links showing a portion thereof flattened for entering the attaching hooks.

Figure 1:
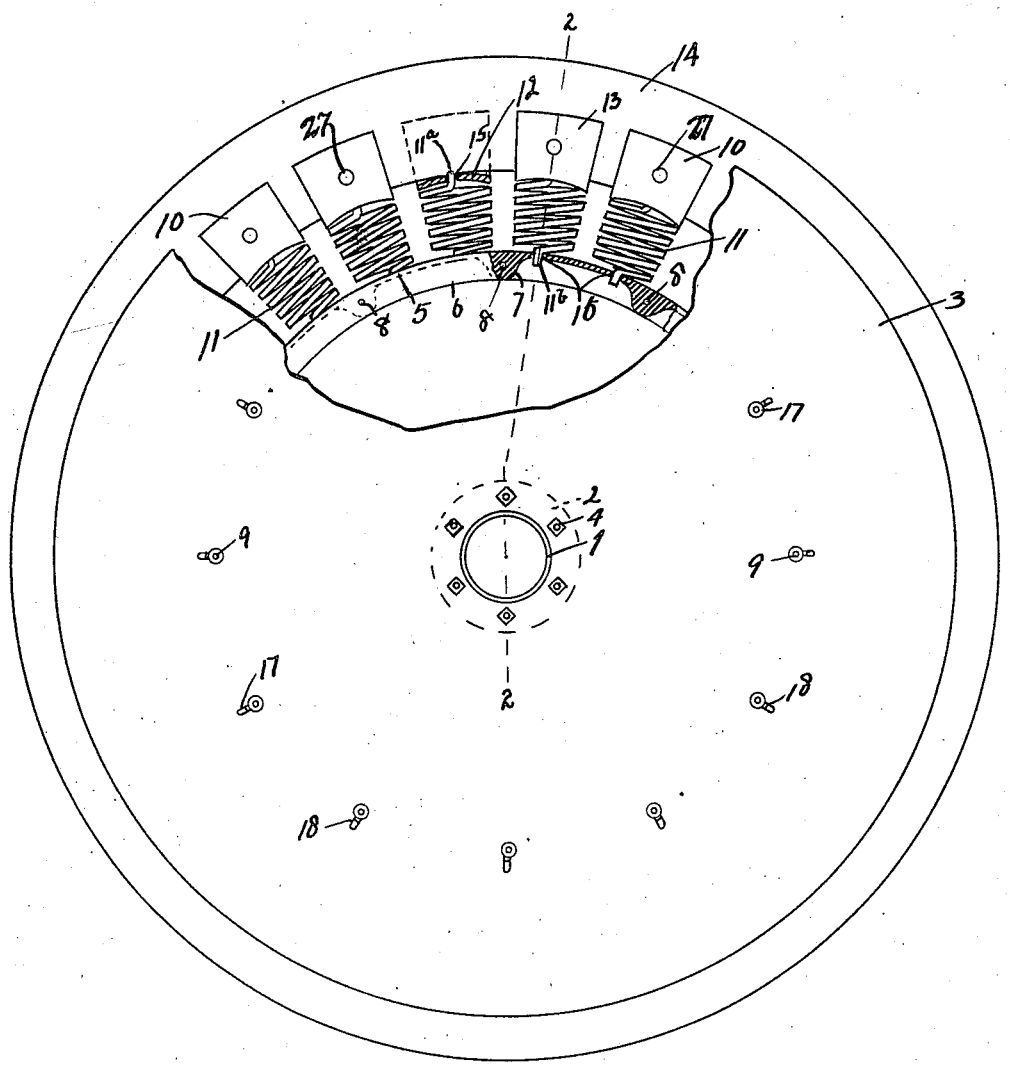
Fig. 1, is a side elevation of a vehicle wheel made in accordance with my improvement, a portion of the side discs being broken away to show the construction and arrangement of the resilient units.

In carrying out my invention as here embodied, 1 represents the hub of the wheel, which hub may be of any suitable design or construction having the flanges 2 and to these flanges are secured the side discs 3 by means of the bolts 4, said bolts passing through suitable holes in said flanges and said discs.

5 represents a ring having flanges 6 formed therewith and having the lugs 7 extending between said flanges said lugs having holes 8 formed therethrough for the passage of bolts 9. These bolts also pass through suitable holes in the side discs 3 and serve to assist in holding said discs in place, the ring serving to properly space the discs apart.

Between the discs 3 extending around the ring 5 at the proper distance therefrom is located the sectional rim composed of the sections 10, each section being an individual unit and having a spring 11 interposed therebetween and the ring 5. Each of these sectional members of the rim consists of a curved bottom 12 and sides 13, the sides of all of these sections forming the flanges for the retention of the rubber tire 14; the curvature on the bottom of each of the sections serving to permit the inner circumference of the tire 14 to roll thereon when in action, thereby preventing undue chafing or cutting of said tire.

Each of the springs 11 has its ends turned outward as indicated at 11$^a$ and 11$^b$, the end 11$^a$ extending through the hole 15 formed in the bottom of each of the sections 13, while the opposite end 11$^b$ extends through one of the holes 16 formed in the ring 5 by which means the springs are kept in proper alignment.

When the tire 14 is placed within the sectional rim it will be held in a distended position by the outward pressure of the springs 11 against the underside of the sections 10, and yet when the wheel is under sufficient load to compress the springs that portion of the tire in contact with the ground will have a resilient action as will be readily understood.

Since the side flanges 13 of the sections 10 are intended to slide back and forth upon the inner surface of the discs 3, I prefer that these coacting surfaces shall be case hardened or otherwise treated to prevent undue wear.

Projections 27 may be formed in the sides of the sections 10 which when embedded in the sides of the tire 14 will serve to prevent said tire from slipping around the wheel.

From the foregoing description it will be obvious that by my improvement a light weight and yet strong wheel will be produced, the tire of which will be sufficiently yielding and resilient to absorb the shocks and vibration incident to travel over a rough road bed, thus overcoming the many disadvantages of pneumatic tires yet retaining all of the advantages thereof.

Should it become necessary to remove the tire sectional rim or the springs this may be readily accomplished by removing one of the discs 3 when easy access will be had to said parts for repair or removal.

Each of the bolts 9 project beyond the outer faces of the side discs so that the hubs of the clips 17 may be screw threaded thereon and these clips are also provided with hooks 18 for the engagement of the end links of the non-skid chains 19. Each of the end links of each of these chains is flattened as indicated at 20 for passage through the narrow space between the ends of the hooks and their hubs, and this is accomplished by turning the links to a horizontal position passing the flattened portion through this narrow space, when by turning this link to a vertical position it will be prevented from disengagement with said hub. By this ready attachment of non-skid chains to the wheel a considerable advantage is gained as each chain is secured upon the wheel independent of the other chains so that the breakage of one chain does not affect the others and therefore could not seriously affect the non-skid quality of the wheel.

In practice the clips 17 may remain upon the wheel when the non-skid chains are not in use or when desired they may be removed since they may be readily reattached when the non-skid chains are to be put in use.

Of course I do not wish to be limited to the exact details of construction as herein shown as these may be varied within the limits of the appended claims without departing from the spirit of my invention.

Having thus fully described my invention, what I claim as new and useful is:—

1. In a vehicle wheel, the combination of a hub, a ring concentric with said hub, two discs bolted to said hub and ring, a sectional rim fitted to slide between the discs, each section of said rim having a curved bottom, a spring interposed between each of said sections and the ring, the ends of said spring projecting through the bottom of its section and ring, and a rubber tire fitted within the sectional rim.

2. A wheel comprising in combination two side discs, a ring located between said discs, said ring having flanges and lugs formed therewith, fastening means passing through the discs and the flanges and lugs on the ring for securing said ring between the discs, a sectional rim fitted between the discs, and a spring interposed between each of the sections of the rim and the ring.

In testimony whereof, I have hereunto affixed my signature.

FLETCHER O. BOSWELL.